Sept. 22, 1959     J. MASSARI     2,905,028
CONTRACTILE TOOL HOLDER
Filed March 24, 1958
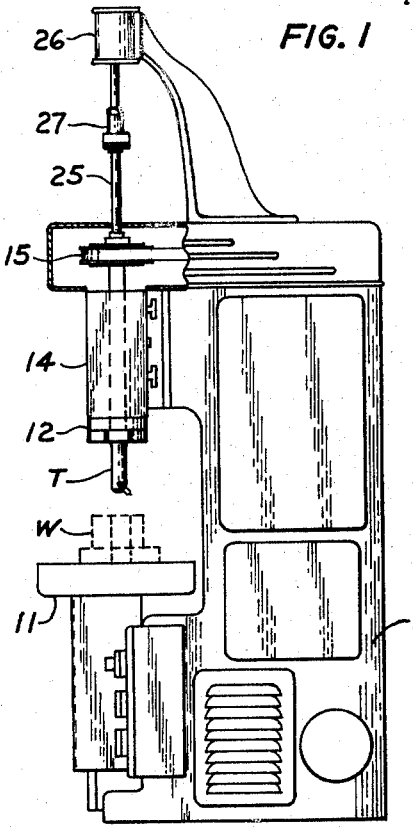
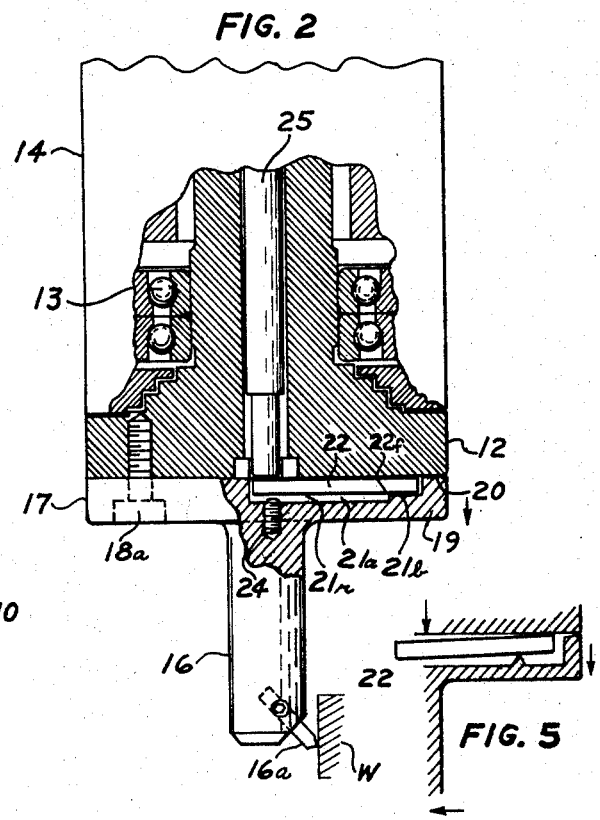
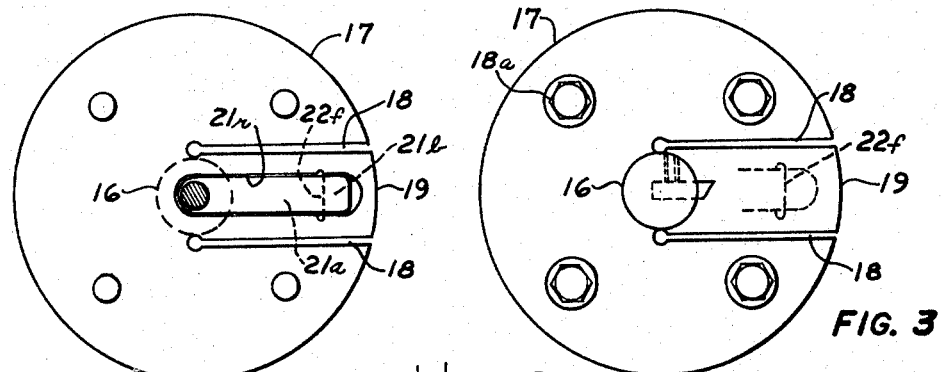
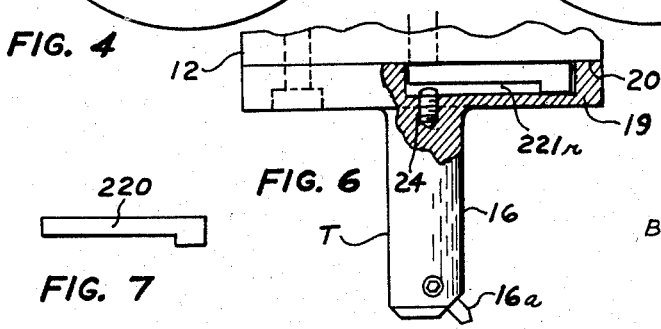
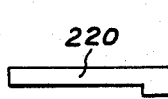
INVENTOR.
JOSEPH MASSARI
BY
*Harold F. ____*
ATTORNEY

2,905,028
CONTRACTILE TOOL HOLDER

Joseph Massari, Plainfield, N.J.

Application March 24, 1958, Serial No. 723,235

6 Claims. (Cl. 77—4)

This invention relates to machine tools, more particularly to rotary tools of the type commonly used to bore cylindrical surfaces. A primary aim of the invention is the construction of a sturdy tool that may be used to precision bore the interior of a cylinder without producing tool scratch marks that are usually occasioned when the tool is back traversed over the finished bored surface.

In the usual boring operation, a cutting tool is mounted in a bar so that its cutting edge projects from one side. In most instances the tool bar is rotated and the work is held stationary while relative axial movement between the work and the tool causes the latter to remove spiraling shavings from the work and progressively develop a cylindrical surface. At the end of the cut the tool is withdrawn from the work and the operation repeated or performed upon another piece.

One major difficulty experienced in such operations is the fact that as the cutting operation progresses the tool and the work are under a certain degree of stress and compression. When the cutting is completed or stopped the compressive forces exert themselves and cause the tool to dig into the finished surface as it is withdrawn and to produce thereon a line or a score mark. Not only is this damaging to the point of the tool but the accuracy and smoothness of the finished surface of the bore is irreparably damaged.

In attempting to eliminate scoring of the work by the tool, various devices for moving the tool or the work out of concentricity with one another have been resorted to including physically shifting the work or the tool spindle laterally, or by constructing an eccentric spindle that bodily shifts laterally when the direction of rotation is changed. An example of the latter type is the construction shown in the patent to Woerner No. 2,642,759. Obviously, devices that involve a great number of relatively movable parts are not only difficult and expensive to manufacture and assemble but are inherently lacking in that high degree of accuracy to obtain and repeatedly obtain a finished-bore size.

Accordingly, a main objective of this invention is to overcome such difficulties and to construct a boring tool that is relatively inexpensive to produce and one which may be relied upon to finish bore a surface with extreme accuracy and without scoring that surface when the tool is back-traveled out of the workpiece. In attaining the objectives of the invention, it is proposed to construct a tool in the form of a boring bar with a flanged end. Such a tool may be secured to the nose end of a spindle, as by means of several screws passing through the flange portion and threading into the end of the spindle. The outer end of the tool is constructed to carry a laterally projecting tool bit in the customary manner. Relative rotation and relative axial movement between the tool and the work will thus cause the cutting point of the tool to inscribe a helical path on the work, and bore out a true cylinder. To prevent scoring of the surface when the tool is withdrawn, the invention proposes to deflect the tool radially a few thousandths at the end of the forward pass so that on the return stroke the cutting point clears and does not touch the finish-bored surface. This may conveniently be accomplished in accordance with this invention by chordally slitting the flanged portion of the holder at opposite sides of the shank of the tool approximately half way so as to form a radial tongue whose inner end is physically integral with the shank of the holder and its flange. Hence, by flexing the outer portion of the tongue section out of the plane of the flange the shank portion of the holder is likewise deflected and the cutting bit carried at the outer end of the shank is moved somewhat radially. Preferably it is proposed that the tongue portion of the flange be deflected away from its seat against the end of the spindle, and if the cutting tool point is caused to project from the side of the shank directly aligned with the tongue portion, it will move radially inwardly as the tongue is flexed, whereas if it is positioned opposite the tongue it will move radially outwardly when the tongue is flexed. The manner of flexing the tongue portion more or less, or gradually, to effect shifting of the cutting point of the tool laterally as the work is entered or as the tool leaves the work or gradually in or out, may be accomplished in various ways, and the following description is a preferred example.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as parts of this disclosure and, in such drawings, like characters of reference denote corresponding parts throughout all the views, of which:

Figure 1 of the drawings illustrates a typical boring machine embodying the invention.

Figure 2 is an enlarged view of a portion of a boring machine spindle with the improved boring tool mounted thereon, certain parts being broken away to illustrate the construction.

Fig. 3 is an end elevation of the tool holder.

Fig. 4 is a plan view of the tool holder as it would appear detached from the spindle.

Fig. 5 is a detail view of a plain actuating key.

Fig. 6 is a side elevation of a modified form of tool holder in which a plain recess has been formed to receive a stepped actuating key such as illustrated in Fig. 7.

Referring more particularly to Fig. 1, the invention is illustrated in connection with a representative type of boring machine that has a main column 10 that houses tool-spindle driving and worktable elevating transmissions. The front of the column supports and guides a vertically movable worktable 11 on which the work W is mounted. The main column also mounts a tool spindle 12 that is journaled in radial-thrust bearings 13 provided in a mounting block 14. The upper end of the spindle is provided with driving means such as pulley 15. A more detailed description of the exemplified boring machine is found in the patent to Babbitt No. 2,816,462.

The improved tool holder indicated generally at T, comprises a shank portion 16 and an integral flange portion 17 which may be secured to the lower end of the spindle by means of several screws 18a. Preferably the mounting is such that the shank 16 is concentric with the spindle and the whole assembly is in kinetic balance.

As illustrated more clearly in Figs. 3 and 4 the flanged portion 17 of the tool holder T is formed with two parallel slots 18 extending from the periphery to a point at or about a perpendicular center line of the assembly.

The section bounded by the slots 18 forms what may be called a radially-extending tongue that is integral with the shank and flange at its inner end and is disconnected from the flange at its outer end.

The application of a force to the outer end of the tongue section in a direction such that the tongue moves away from its normal bearing engagement with the end face of the spindle tends also to deflect the outer end of shank portion 16 of the holder laterally. Hence, if, on the one hand, a tool bit 16a is secured to the shank at the side thereof underlying the tongue 19, as illustrated in Fig. 2, it will be moved in the direction of the arrow toward the axis of the tool and away from the wall of the workpiece W. On the other hand, if the cutting bit is secured in the shank in a position diametrically opposite the tongue it will move radially outwardly when the deflecting forces are applied to the tongue. In the first case the tool point is shifted from a larger cutting radius to a smaller, and in the second case the point is shifted from a smaller turning radius to a larger. Hence, depending upon the nature of the operation to be performed, a tool holder constructed in accordance with this invention can be made to cut "big" normally, or "big" when it is flexed. Also, if two tool bits are mounted in the shank opposite one another at slightly differing radial distances, one may be used as the boring tool to cut in one direction of feed and the other when feeding in the opposite direction, the flexing of the holder being caused to occur automatically or cyclically with the reversals in feed.

A simple form of actuating means for the holder is illustrated in the drawings and consists in forming an elongated recess 21 in the holder which extends from the center of the holder radially outwardly in the tongue section 19 and is closed at its peripheral end. In the form shown in Fig. 2, the recess is formed with two depths, a low level 21a, and a shorter but higher level 21b that forms an anvil-like portion. Within the recess 21 is placed a flat key or lever 22 that rests on the anvil portion 21b and fills the space between it and the overlying end surface of the spindle 12. The inner end of the key is thus caused normally to stand away from the bottom level 21a of the recess 21. The juncture line 22f of the upper level 21b with the lower level 21a forms a fulcrum point for the lever 22. The action is such that as the inner end of the lever 22 is pressed downwardly the outer end tends to lift. However, since lifting is prevented by the spindle end, the tongue section 19 will be flexed downwardly and simultaneously throw the outer end of the tool holder laterally out of its normal position. When pressure on the inner end of the actuating lever 22 is released the holder automatically returns to its original position in which the tongue section again bears directly on the end face of the spindle thus restoring the cutting point 16a to its normal position.

Adjustable flex-limiting means may be provided to give definite control to the extent of lateral shifting that may be produced when the lever is depressed, one such form being illustrated herein as an adjustable stop pin 24 located in the holder preferably under the inner end of the lever 22. By adjusting the stop pin 24 in or out the size of the gap between it and the lever may be varied and this in turn will adjustably control the extent the cutting point of the tool is thrown over when the lever is rocked about its fulcrum.

Built-in power means may be provided to rock the lever 22 about its fulcrum, such as the rod 25 that extends upwardly through the center of the spindle and operatively connects with a power cylinder 26 or to some other form of actuator, i.e. a cam or lever. Preferably a swivel coupling 27 is inserted between the rod 25 and its actuator so that the rod may turn with the spindle while the actuator remains stationary. Alternatively a small hydraulic cylinder may if desired be built-in the spindle at its lower end to act directly on the lever 22 or directly on the tongue section.

In the embodiment illustrated in Figs. 6 and 7 the recess 221r in the holder is formed with a flat bottom, instead of being stepped as in Fig. 2, and the step is formed in the underside of the lever 220. Functionally the Figs. 6 and 7 variant is the same as Fig. 2 and further description is not considered necessary.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A tool holder of the boring type comprising a member having a flanged portion adapted to be secured to a machine tool spindle and a coaxially related projecting shank portion adapted to mount a cutting tool, said flanged portion of the holder having a pair of parallel slots formed therein extending in planes paralleling the axis of the holder from the periphery of the flange inwardly toward the axis of the holder and which slots terminate approximately at a diametral line perpendicular to the slots, said slots thereby defining a radially extending tongue portion that is integral with the flange portion and the shank portion of the holder at its inner end and is disconnected from the said flange portion at its peripheral end, said tongue portion having a recess formed therein, and means comprising a lever embedded in the recess provided in the tongue portion adapted when actuated to flex the peripheral end of said tongue portion out of the plane of the said flange portion thereby to cause a proportionate shifting of the outer end of the shank portion out of said coaxial relationship with the flange portion.

2. The combination of claim 1 including means for limiting the extent the outer end of the tongue may be moved out of seating engagement with the spindle thereby to control the extent of lateral movement imparted to the outer end of the shank.

3. A boring tool comprising a member having a flanged portion adapted to be seated against and to be secured to a spindle and a coaxial projecting shank portion adapted to mount a tool, said flanged portion of the holder having a pair of parallel slots formed therein extending from the periphery of the flange inwardly toward the shank and which slots terminate approximately at the diameter of the holder, said slots thereby defining a radially extending tongue portion that is integral with the flange and the shank portions of the holder at its inner end and disconnected from the said flange at its peripheral end, and said tongue portion having a radially extending recess formed therein adapted to receive a lever, a lever in said recess fulcrumed intermediate its ends within the recess, the lever and fulcrum being so related to the tongue portion that movement imparted to one end of the lever causes the other end of the lever to move about the fulcrum and to move the peripheral end of the tongue portion away from seating engagement with the spindle thereby to cause the outer end of the shank of the tool to shift laterally, and means to actuate the said lever.

4. The combination of claim 3 in which the recess in the tongue portion is double stepped so as to form a fulcrum at the juncture of the steps.

5. The combination of claim 3 in which the recess formed in the tongue portion has a relatively flat bottom surface, and in which the lever in said recess is double-stepped to provide a fulcrum intermediate the ends of the lever at the juncture of the steps.

6. A boring tool comprising a member having a flanged portion adapted to be seated against and secured to a surface and a coaxial projecting shank portion adapted to mount a tool, said flanged portion of the tool having a movable radially extending section that is integral with the flange portion and with the shank portion of the holder at its inner end and disconnected from the said flange portion at its peripheral end, and means to move the outer end of said radially extending section out of the plane of the said flange portion and away from seating engagement with said surface thereby to cause movement of the outer end of the shank portion out of coaxial relationship with said flange portion, said last named means including a fulcrumed lever disposed between the radially extending section and the surface to which the flanged portion of the member is secured, and means at the axis of the tool for actuating the lever.

References Cited in the file of this patent

UNITED STATES PATENTS

| | | |
|---|---|---|
| 2,237,692 | Stewart | Apr. 8, 1941 |
| 2,286,217 | Martin | June 16, 1942 |
| 2,844,053 | Wagner et al. | July 22, 1958 |